US007679502B2

(12) United States Patent
Fukumori

(10) Patent No.: US 7,679,502 B2
(45) Date of Patent: Mar. 16, 2010

(54) TIRE MANAGEMENT SYSTEM

(75) Inventor: Hajime Fukumori, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 384 days.

(21) Appl. No.: 11/698,841

(22) Filed: Jan. 29, 2007

(65) Prior Publication Data

US 2007/0194898 A1    Aug. 23, 2007

(30) Foreign Application Priority Data

Jan. 30, 2006  (JP)  ............... 2006-020514

(51) Int. Cl.
  *B60C 23/00*  (2006.01)
(52) U.S. Cl. .............. 340/447; 73/146.5; 340/445; 455/67.11
(58) Field of Classification Search ......... 340/442–447, 340/870.16, 505; 73/146.5
  See application file for complete search history.

(56) References Cited

U.S. PATENT DOCUMENTS

| 5,594,944 | A | * | 1/1997 | Ogata et al. ............. 455/516 |
| 6,278,363 | B1 | * | 8/2001 | Bezek et al. ............. 340/442 |
| 6,954,688 | B2 | * | 10/2005 | Katou ..................... 701/29 |
| 7,406,349 | B2 | * | 7/2008 | Seeberger et al. ......... 607/30 |
| 2002/0084896 | A1 | * | 7/2002 | Dixit et al. ............. 340/447 |
| 2002/0126005 | A1 | * | 9/2002 | Hardman et al. ......... 340/442 |
| 2005/0151634 | A1 | * | 7/2005 | Tsuji et al. ............. 340/445 |

FOREIGN PATENT DOCUMENTS

WO  2005/123422 A1  12/2005

OTHER PUBLICATIONS

Australian Office Action dated May 12, 2008.

* cited by examiner

*Primary Examiner*—Brent Swarthout
(74) *Attorney, Agent, or Firm*—Sughrue Mion, PLLC

(57) ABSTRACT

A receiving module selects frequencies to be used for data request signals from all channels if there is no channel prohibited from being used, and if there are channels prohibited from being used, the receiving module selects frequencies to be used for data request signals from channels other than the channels prohibited from being used. In the case failed in acceptance of measured data from a sensor module, the receiving module sets communication channels failed in acceptance of measured data predetermined times to prohibited channels from being used. In this manner, when the receiving module transmits the data request signals to the sensor module, frequencies of channels having jamming radio waves and the like could not be selected by the receiving module, thereby enabling the receiving module to select the frequencies of high probability in communication reception.

4 Claims, 8 Drawing Sheets

FIG. 5

(a) | f | ID | CMD |

(b) | ID | DATA | OK/NG |

TIRE MANAGEMENT SYSTEM

TECHNICAL FIELD

This invention relates to an improvement in a tire management system comprising sensor modules each installed in the inner side of a tire mounted on a vehicle for measuring quantities of state of the tire including a tire inner pressure, and receiving modules each provided at a vehicle body for receiving measured data transmitted from the sensor module.

RELATED ART

In order to manage tires of mining vehicles being driven, it has been proposed to equip the vehicle with a tire management system comprising sensor modules each installed in the inside of a tire for measuring quantities of state of the tire such as an inner pressure, temperature and the like of the tire, and receiving modules each provided at the vehicle body for receiving measured data from the sensor module so that the received data are transmitted to a vehicle driving control center for managing a plurality of vehicles as in, for example, Japanese Patent Application Laid-open No. H10-104,103 (1998). This proposal has an object to preclude a dangerous situation before happens by instructing a driver to take necessary actions from the vehicle driving control center, upon predicting a possibility of vehicle failure on the basis of the data of each vehicle in the tire management system.

In such a tire management system, each of the receiving modules transmits a data request signal to a corresponding sensor module in a predetermined cycle so that the sensor module measures quantities of tire state in response to the timing of reception of the data request signal to transmit the measured results to the receiving module. In this way, the receiving module can obtain the measured data from the sensor module.

By the way, generally a certain frequency zone has been opened for the exchange of signals between the receiving modules and sensor modules. However, particular channels within the frequency zone frequently could not be used for this purpose owing to special circumstances depending on a mine. For example, channels having jamming radio waves and channels being used by other instruments may not be used. Therefore, the tire management system described above has also a function that upon failure in communication using a channel among a plurality of channels previously prepared, the failed channel is replaced with another channel. On the contrary, it can be expected to improve the probability of signal reception by constructing the receiving modules in a manner that they originally could not select such channels having jamming radio waves and the like. For this purpose, it has been carried out to previously detect the channels having jamming radio waves and the like by the use of a spectrum analyzer. However, this approach would provide a problem that the use of the spectrum analyzer is tedious and time-consuming.

DISCLOSURE OF THE INVENTION

The invention has been made in view of such problems described above, and has an object to provide a tire management system which detects channels having jamming radio waves and the like without using a spectrum analyzer so that in transmitting data request signals to sensor modules, receiving modules are unable to select frequencies of channels having the jamming radio waves and the like so as to be able to select the frequencies of high reception probability for the sensor modules, thereby enabling the receiving modules to exchange signals rapidly between the sensor and receiving modules.

In order to achieve the above object, the present invention provides a tire management system including sensor modules each installed in the inner side of a tire mounted on a vehicle for measuring quantities of state of the tire and transmitting the measured data to a vehicle body, and receiving modules each provided at the vehicle body for transmitting data request signals requesting said measured data to said sensor module in predetermined cycles and obtaining the measured data transmitted from the sensor module, wherein each of said receiving modules is adapted to transmit the data request signal to said sensor module at a frequency of a communication channel other than the channels which have already failed predetermined times in communication with said sensor module.

Preferably, said predetermined times are those by which the channels can be judged to be assuredly unable to be used.

Moreover, the present invention also provides a tire management system including sensor modules each installed in the inner side of a tire mounted on a vehicle for measuring quantities of state of the tire and transmitting the measured data to a vehicle body, and receiving modules each provided at the vehicle body for transmitting data request signals requesting said measured data to said sensor module in predetermined cycles and obtaining the measured data transmitted from the sensor module, wherein each of said receiving modules is adapted to transmit the data request signal to said sensor module at a frequency of a communication channel other than the channels whose numbers of failures in communication are within a range from the maximum to Nth (N: natural number of 1 or more).

The tire management system according to the invention is adapted to make it impossible for the receiving modules to select the communication channels which have already failed predetermined times in communication between the receiving and sensor modules and also the communication channels whose numbers of failures in communication channels are within a range from the maximum to Nth (N: natural number of 1 or more), so that the receiving modules can transmit the data request signals at frequencies of channels of high probability of reception for the sensor modules, thereby enabling the receiving modules to transmit and receive the signals to and from the sensor modules promptly.

BRIEF DESCRIPTION OF THE DRAWINGS

FIG. 5a is a conceptual diagram illustrating a structure of a data request signal transmitted by the receiving module;

FIG. 5b is a conceptual diagram illustrating a structure of a measured data signal transmitted by the sensor module;

BEST MODE FOR CARRYING OUT THE INVENTION

Figure 1:
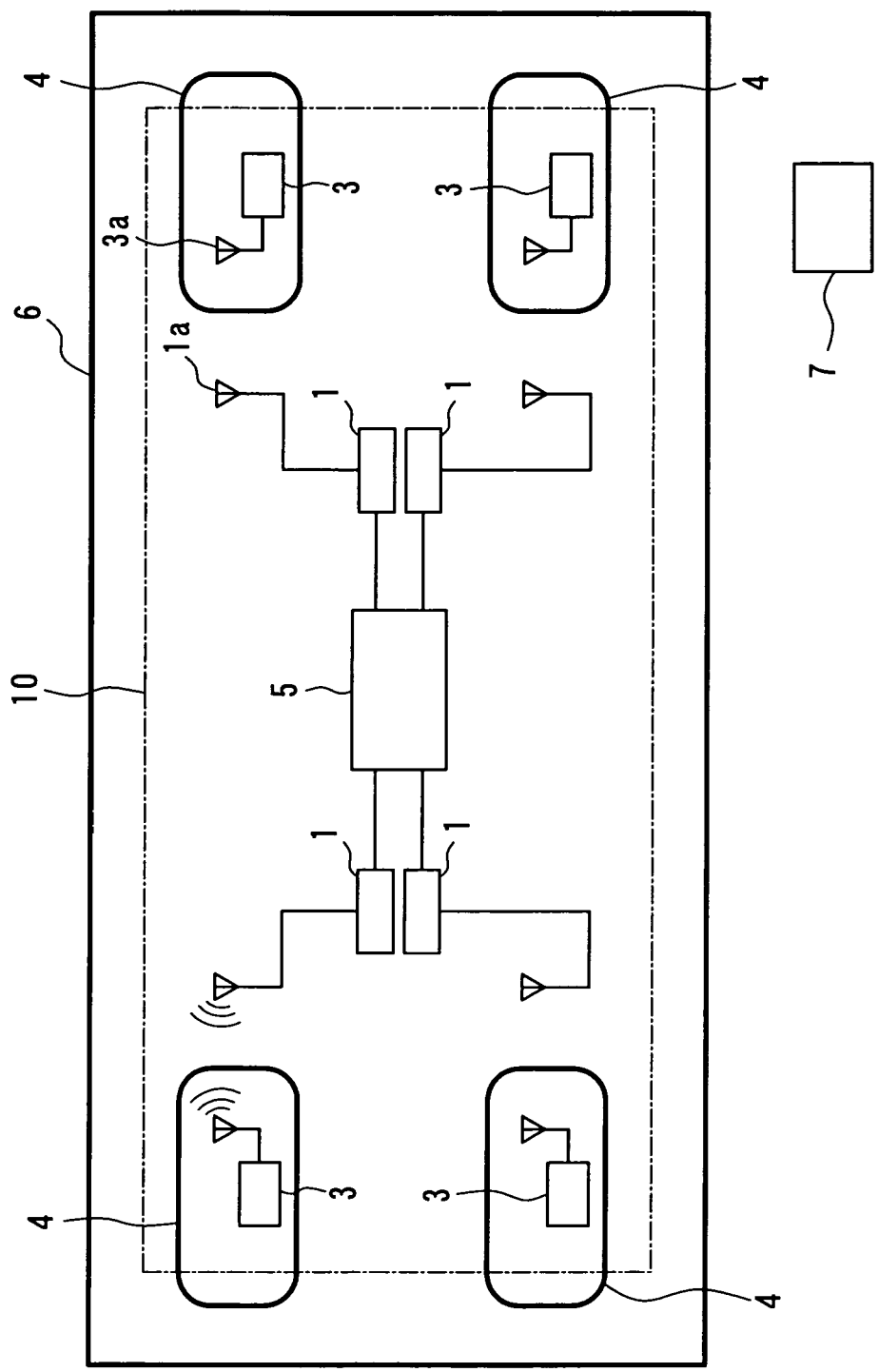
FIG. 1 is an outline layout drawing illustrating the configuration of the tire management system.

Preferred embodiments of the invention will then be explained with reference to the drawings. FIG. 1 is an outline layout drawing illustrating the configuration of the tire management system according to the invention. A sensor module 3 is installed in each of tires 4 mounted on a vehicle 6.

The sensor module 3 is installed in the inner surface of the tire 4 by means of spot cure in a manner that the sensor module 3 is not damaged or dislodged from the tire even if the tire is subjected to a load to be deformed when the vehicle is being driven. Moreover, the sensor module 3 comprises sensing means for sensing an inner pressure and the like of the tire, an antenna 3a for exchanging signals between the sensor module 3 and a receiving module 1, a transmitter, and control means for controlling these units. The sensing means may include such a sensing means which is able to sense a temperature of the tire in addition to the inner pressure. As an alternative, the sensor module 3 may be secured to the wheel in the inner space of the tire, or may be held in the inner space of the tire by means of separate means.

The tire management system 10 comprises the sensor modules 3 each installed in the respective tire 4 of the vehicle 6, the receiving modules 1 each having an antenna 1a for receiving radio signals including data of temperature and pressure from the sensor module 3 to obtain temperature and pressure data from the antenna 1a, a central control module 5 for commanding the receiving modules 1 to receive data from the respective sensor modules 3, and a vehicle driving control system 7 for monitoring the driven conditions of tires by receiving signals transmitted from the central control module 5 on the radio. As an alternative, the receiving modules 3 may be arranged in the central control module 5.

Figure 2:
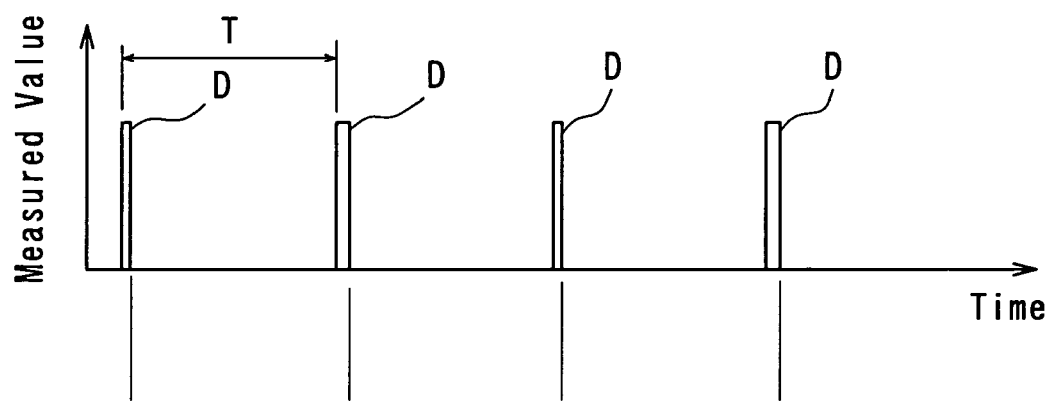
FIG. 2a is a timing chart illustrating an example of signal outputs of a receiving module.
FIG. 2b is a timing chart illustrating an example of signal outputs of a sensor module.
Figure 2:
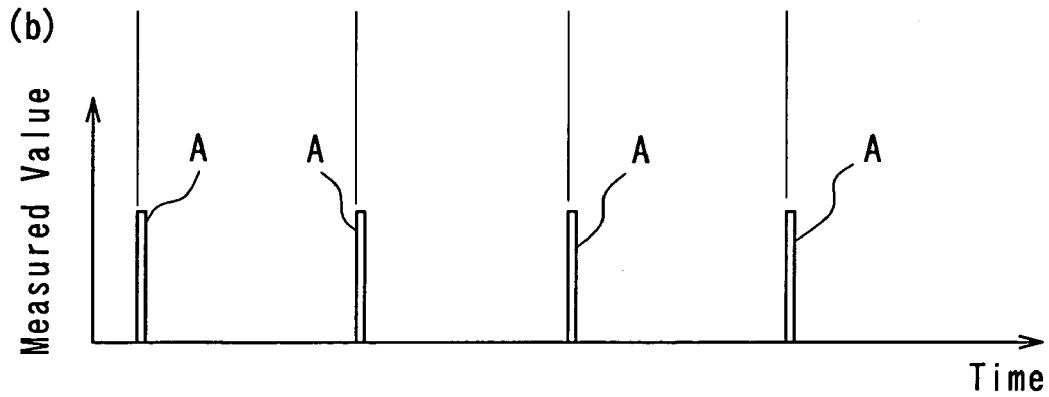

FIG. 2a is a timing chart illustrating timings for transmitting data request signals D from the receiving module 1 to the sensor module 3 for requesting the sensor module 3 to transmit the measured data. A transmission cycle of the data request signals D can be determined as a cycle T, and the transmitting process for the data request signal D is performed repeatedly at time intervals of the cycle T.

FIG. 2b is a timing chart illustrating timings at which the sensor module 3 transmits the measured data. When the sensor module 3 senses the data request signals D transmitted from the receiving module 1 at the time intervals of the cycle T, measuring processes are performed by the sensor module 3 for measuring quantities of state of the tire such as the inner pressure of the tire or the like, and transmitting processes are then performed for transmitting measured data signals A as measured results to the receiving module 1 through the antennas 3a and 1a.

Figure 3:
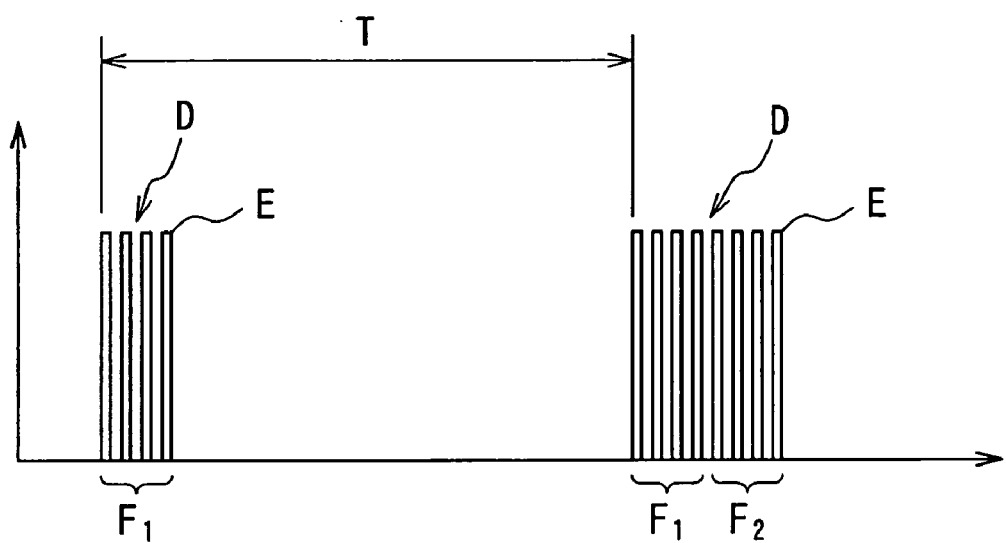
FIG. 3 is a timing chart illustrating a data request signal on an enlarged scale.

FIG. 3 is a timing chart illustrating the data request signals D in FIG. 2a on an enlarged scale. The data request signal D transmitted from the receiving module 1 consists of a plurality of the data request signals E transmitted in the predetermined cycle and gathered together as shown in FIG. 3. If there is no data transmission from the sensor module 3 within a predetermined time cycle in spite of the data request signals E at a frequency $F_1$, the receiving module 1 transmits the data request signals E again to expect a transmission of data from the sensor module. Moreover, an upper limit B (B=4 in FIG. 3) of number of failures in communication has been previously determined for each of data request signals E. In the case of no data transmission from the sensor module 3 even if the data request signals E are repeatedly transmitted until the number of failures in communication arrives at the upper limit B, further data request signals E are transmitted at a frequency $F_2$ different from the frequency $F_1$ to expect a transmission of data from the sensor module. The transmission operation for the data request signals E is stopped when the data transmission from the sensor module 3 has been confirmed. Therefore, the number of the data request signals E will vary depending upon whether the data have been transmitted or not from the sensor module.

Figure 4:
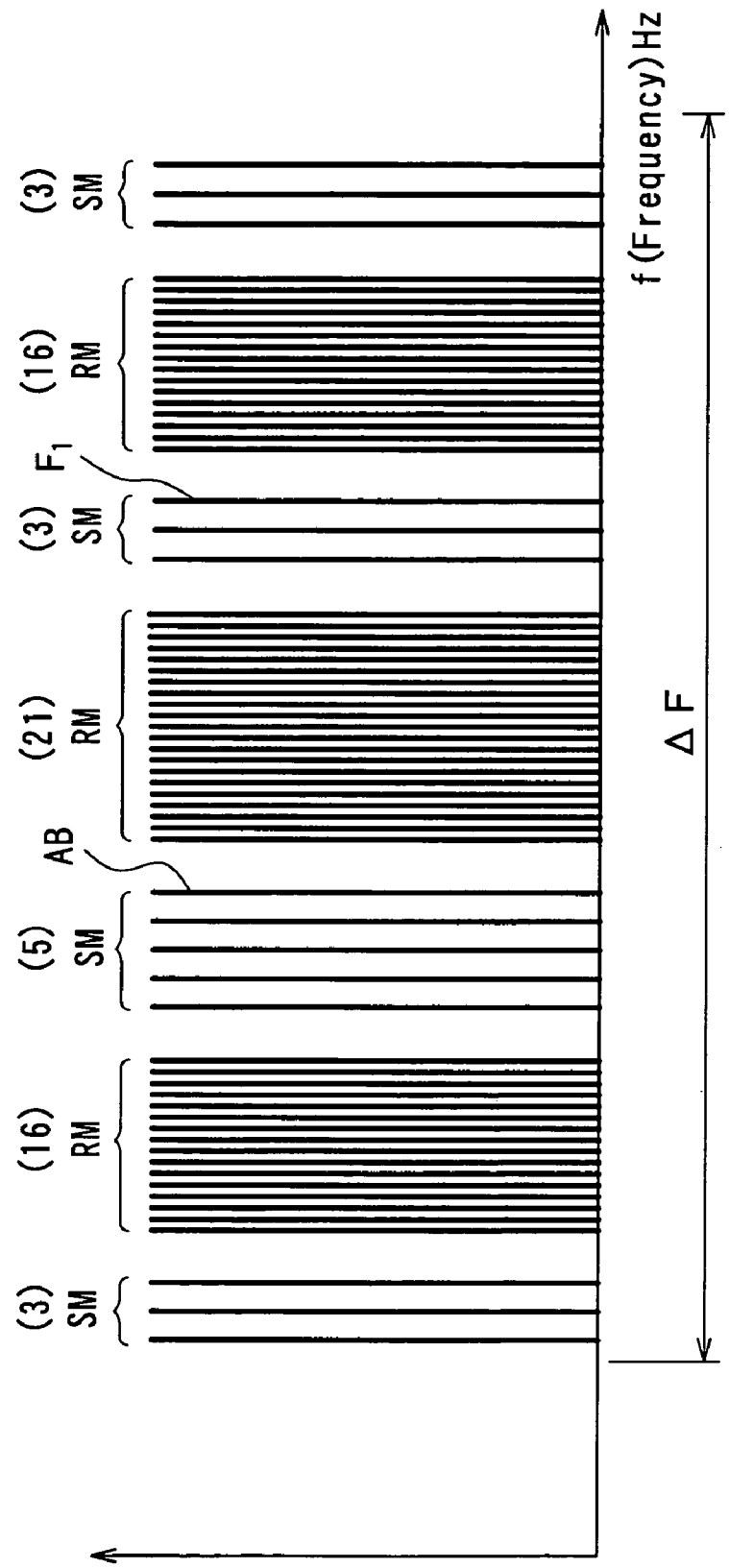
FIG. 4 is a conceptual diagram illustrating frequency zones to be used by the receiving and sensor modules for data transmission.

FIG. 4 is a conceptual illustration showing frequency zones for use in respective data transmissions from the receiving module 1 and the sensor module 3, its abscissa illustrating frequencies. The frequency zones to be used for the transmission by the receiving module 1 and the sensor module 3 are previously determined by dividing a given frequency zone ΔF as shown into respective zones in a manner not being overlapped. In the illustrated example, a total of 53 channels denoted by RM are assigned to the transmission of data request signals from the receiving module 1 to the sensor module 3, while a total of 14 channels denoted by SM are assigned to the transmission of the measured data signals from the sensor module 3 to the receiving module 1.

Identification codes for the channels used for transmitting the measured data signals from the sensor module 3 are transmitted to the sensor module 3 as part of the data request signals to be transmitted by the receiving module. Upon receiving the signals, the sensor module 3 will transmit the measured data signals by the use of the frequency of the channel just designated in the data request signals.

Figure 5:
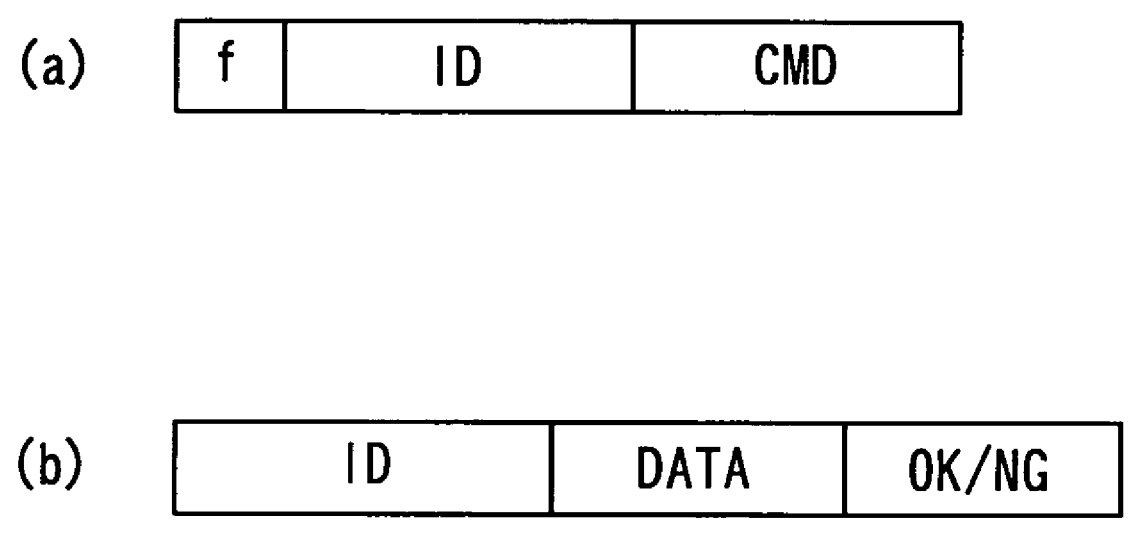

FIGS. 5a and 5b are diagrams illustrating data structures. FIG. 5a shows a data request signal to be transmitted by the receiving module, which consists of the command CMD representing the request for data transmission, the self-identification code ID of the sensor module to which the data request signal is transmitted, and in addition as described above the identification code f representing the channel to be used by the sensor module 3 in transmitting the measured data signal. On the other hand, FIG. 5b illustrates a structure of the measured data signal transmitted by the sensor module 3, which consists of measured data DATA, abnormal flags OK/NG, and ID of the sensor module 3 performing the transmission.

Figure 6:
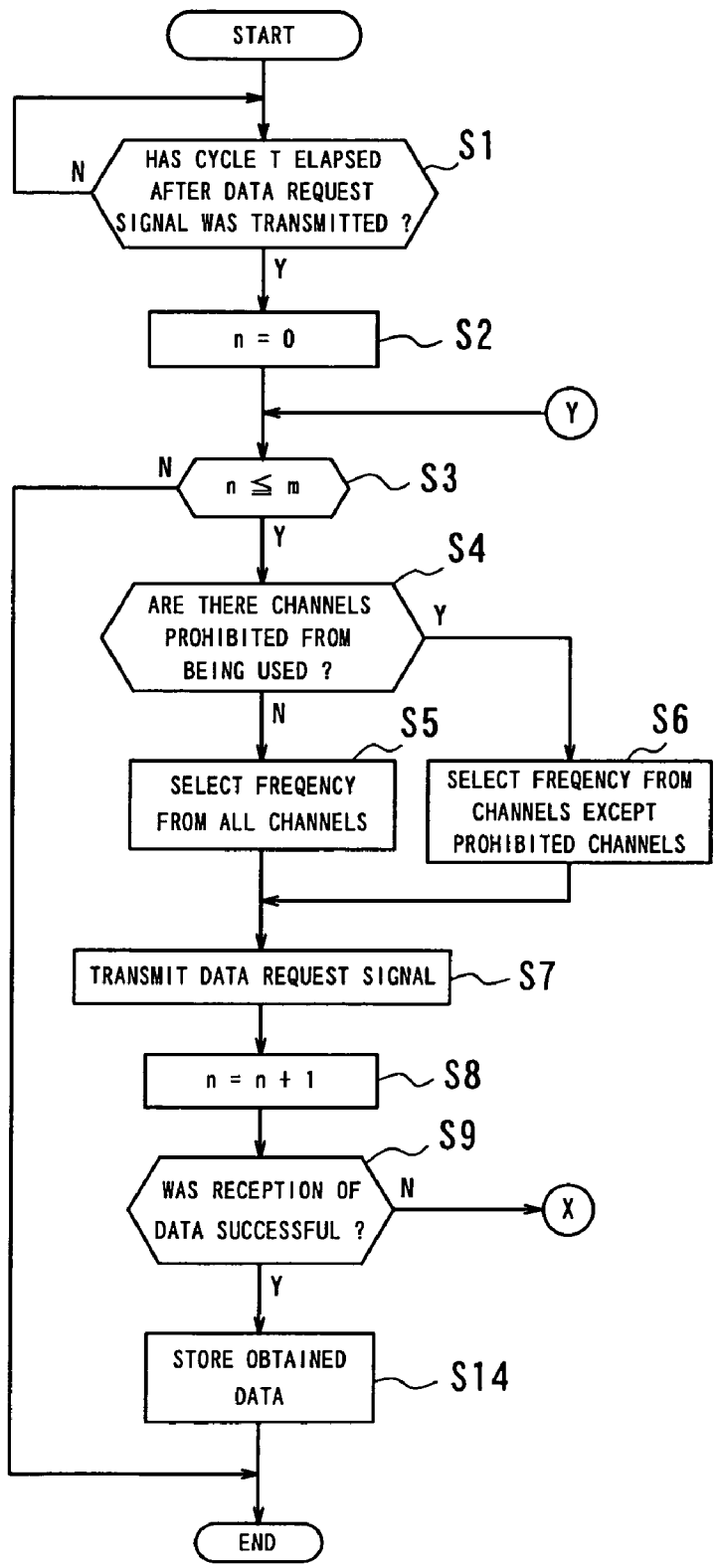
FIG. 6 is a flow chart illustrating processes in the receiving module according to the first embodiment of the invention.
Figure 7:
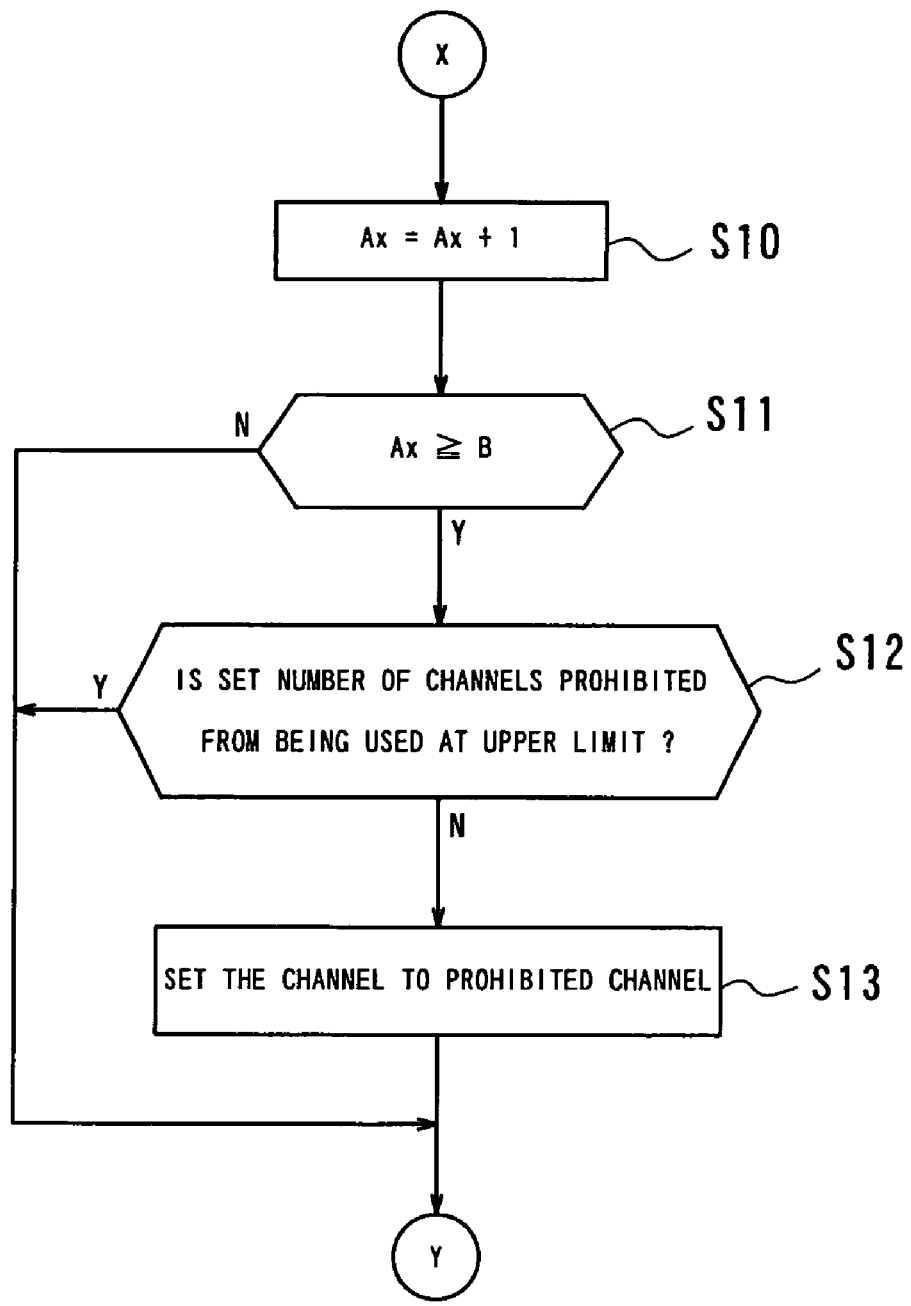
FIG. 7 is a flow chart illustrating processes in the receiving module according to the first embodiment of the invention.

The operation of the receiving modules in the tire management system according to the invention will then be explained in detail. FIGS. 6 and 7 are flow charts illustrating processes performed by the receiving module 1 in the first embodiment according to the invention.

In the step S1, the receiving module 1 judges whether the time of cycle T has elapsed since the point of time when the data request signal was transmitted to the sensor module 3 previous time. If the time of cycle T has not elapsed yet, the process in the step S1 is repeated until the time of cycle T has elapsed. When the time of cycle T has elapsed, a count n is set to 0 (step S2). The count n represents the number of transmissions of the data request signals at a certain frequency.

In step S3, subsequently, a procedure is performed to judge whether the count n which is the number of the data request signal transmissions is more or less than the upper limit m of the number of the transmissions, which has been determined for the data request signal. At this time, the count n has been set to 1 so that the count n is less than m. In step S4, therefore, a procedure is performed to judge whether there are channels prohibited from being used. If there are no channels prohibited from being used, the frequency of the data request signal to be used is selected from all the channels (step S5), while if there are some channels prohibited from being used, the frequency of the data request signal to be used is selected from the channels other than those prohibited from being used (step S6).

In step S7, then the receiving module 1 transmits the data request signal at the frequency of the selected channel to the sensor module 3 and in step S8, the count n representing the number of data request signal transmissions is increased by one.

In step S9, then the receiving module 1 judges whether it has succeeded in receiving the measured data from the sensing module 3. If it is confirmed that the reception of the measured data has been successful, the measured data obtained from the sensor module 3 are stored (step S14).

In the case that the receiving module 1 failed to receive the measured data from the sensor module 3, it is assumed that the sensor module 3 could not receive the data request signal from the receiving module 1, and a count Ax for the communication channel of the frequency used for the failed data request signal is increased by one (step S10 in FIG. 7). The count Ax stores failed numbers in communication of the communication channel, and is provided for each of communication channels. Then, in step S11, a procedure is performed to judge whether the count Ax is more or less than the upper limit B of the count. The upper limit B of the count is a number by which the channel can be judged to be assuredly unable to be used due to jamming radio waves and the like.

If the count Ax is more than the upper limit B of the count, subsequently, in step S12 a procedure is performed to judge whether the set number of channels prohibited from being used is at an upper limit or not. If the set number of the prohibited channels is not at the upper limit, in step S13 the channel used when failed to receive the measured data is set to a channel prohibited from being used. The reason why the upper limit is provided for the set number of the prohibited channels is as follows. If the channels prohibited from being used can be set without any limitation, the set number of prohibited channels would exceed the number of channels which the receiving module can use inherently, and in such a case there would be no channels from which the receiving module can select a channel. Therefore, the set number of the channels prohibited from being used will be less than the number of the channels to be inherently used.

In the cases that the count Ax is less than the upper limit B in the step S11, that the set number of channels prohibited from being used is at the upper limit in the step S12, and that the channels prohibited from being used have been set in the step S13, the process is returned to the step S3.

In step S3, a procedure is performed to judge whether the count n is more or less than the upper limit m of the number of transmissions. If the count n is less than m, the procedure in the step S4 is again performed to judge whether there are channels prohibited from being used.

In the cases that the count n is more than m in the step S3, and that the reception of the measured data from the sensor module 3 has been successful and the measured data obtained are stored in the step S14, the above process routine is ended. And replacing with the other receiving module, the above process routine is started between the other receiving module and a corresponding sensor module again.

Figure 8:
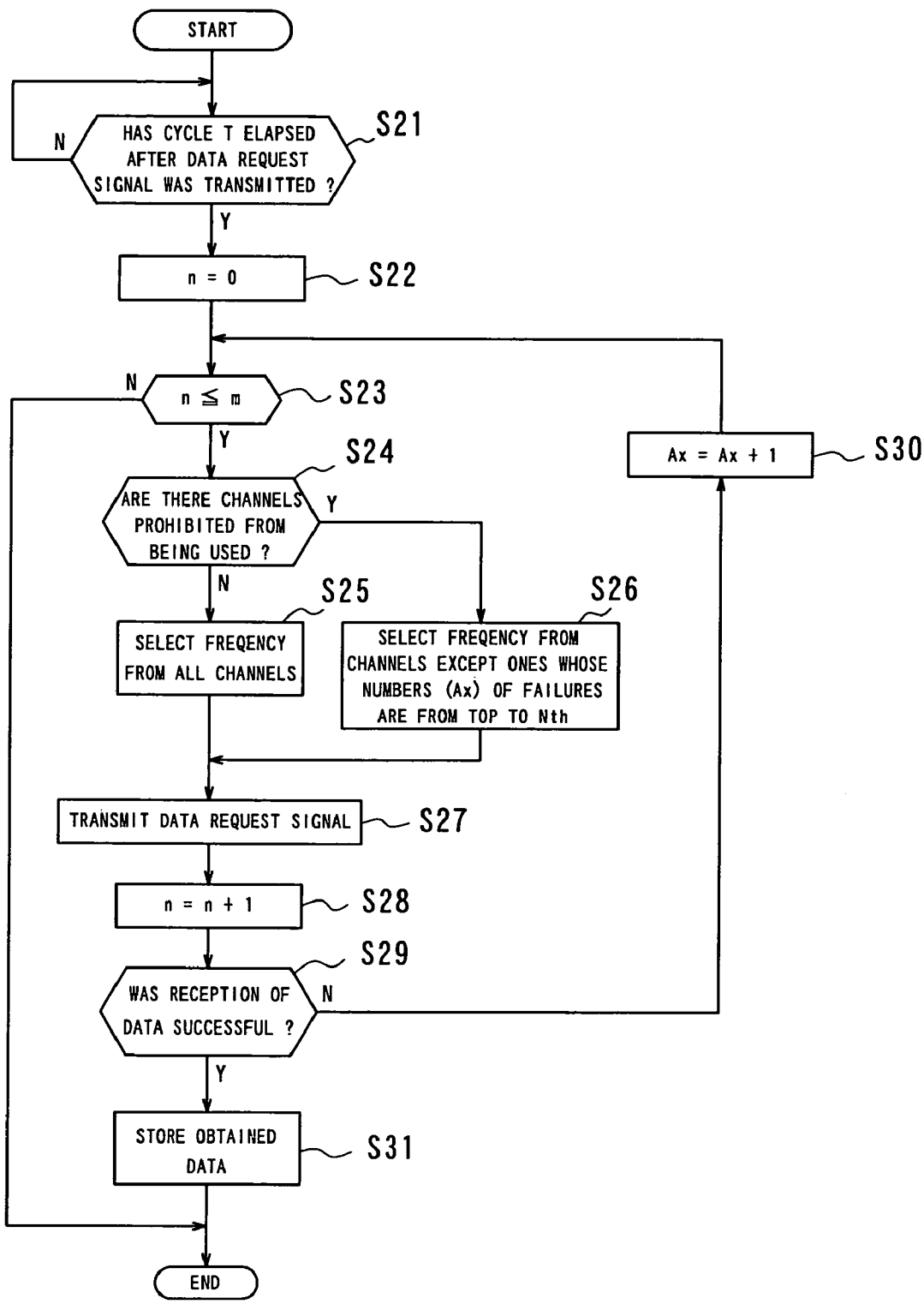
FIG. 8 is a flow chart illustrating processes in the receiving module according to the second embodiment of the invention.

The operation of the receiving module according to the second embodiment of the invention will then be explained in detail. FIG. 8 is a flow chart illustrating processes performed by the receiving module 1 in the second embodiment.

In the step S21, the receiving module 1 judges whether the time of cycle T has elapsed since the point of time when the data request signal was transmitted to the sensor module 3 previous time. If the time of cycle T has not elapsed yet, the process in the step S21 is repeated until the time of cycle T has elapsed. When the time of cycle T has elapsed, a count n is set to 0 (step S22). The count n represents the number of transmissions of the data request signals at a certain frequency.

In step S23, subsequently, a procedure is performed to judge whether the count n which is the number of the data request signal transmissions is more or less than the upper limit m of the number of the transmissions, which has been determined for the data request signal. At this time, the count n has been set to 1 so that the count n is less than m. In step S24, therefore, a procedure is performed to judge whether there are channels prohibited from being used. If there are no channels prohibited from being used, the frequency of the data request signal to be used is selected from all the channels (step S25), while if there are some channels prohibited from being used, the frequency of the data request signal to be used is selected from the channels other than those whose numbers of failures in communication channels are within a range from the maximum to Nth (N: natural number of 1 or more) in the count Ax storing the numbers of failures in communication channels (step S26).

In step S27, then the receiving module 1 transmits the data request signal at the frequency of the selected channel to the sensor module 3 and in step S28, the count n representing the number of data request signal transmissions is increased by one.

In step S29, the receiving module 1 judges whether it has succeeded in receiving the measured data from the sensing module 3. If it is confirmed in step S29 that the reception of the measured data has been successful, the measured data obtained from the sensor module 3 are stored (step S31).

In the case that the receiving module 1 failed to receive the measured data from the sensor module 3, it is assumed that the sensor module 3 could not receive the data request signals from the receiving module 1, and in step S30 a count Ax for the communication channel of the frequency used for the data request signal failed in communication is increased by one, and the procedure is returned to the step S23.

In step S23, subsequently, a procedure is performed to judge whether the count n is more or less than m. If the count n is less than m, in the step S24 the procedure is again performed to judge whether there are channels prohibited from being used.

In the cases that the count n is more than m in the step S23, and that the reception of the measured data from the sensor module 3 has been successful and the measured data obtained are stored in the step S31, the above process routine is ended. And replacing with the other receiving module, the above process routine is started between the other receiving module and a corresponding sensor module again.

As described above, the tire management system according to the invention is adapted to make it impossible for the receiving modules to select the communication channels which have already failed predetermined times in communication between the receiving and sensor modules and also the communication channels whose numbers of failures in communication channels are within a range from the maximum to Nth (N: natural number of 1 or more), so that the receiving modules can transmit the data request signals at frequencies of channels of high probability of reception for the sensor modules, thereby enabling the receiving modules to transmit and receive the signals to and from the sensor modules promptly.

Moreover, the present invention is also applicable to transmissions of measured data from a sensor module to a receiving module.

The present invention is not to be limited to tires for use with mining vehicles, but is applicable to systems for measuring in real time status information of all kinds of tires including tires of passenger automobiles.

The invention claimed is:

1. A tire management system comprising:
   a plurality of sensor modules, which each measure quantities of state of a tire and transmit the measured data to a vehicle body, each of said plurality of sensor modules being installed inside the tire mounted on a vehicle, and
   a plurality of receiving modules, which each transmit data request signals requesting said measured data to said sensor module in predetermined cycles and obtain the measured data transmitted from at least one of said plurality of sensor modules, each of said plurality of receiving modules being provided on the vehicle body,
   wherein each of said plurality of receiving modules transmits the data request signal to said at least one sensor module using a communication channel frequency selected from a plurality of channel frequencies other than any communication channel frequencies which have been used by any of the receiving modules a predetermined number of times to unsuccessfully communicate with said at least one sensor module, and
   wherein each of said plurality of receiving modules adds the communication channel frequencies which have been used by any of the receiving modules a predetermined number of times to unsuccessfully communicate with said at least one sensor module to a list of prohibited communication channel frequencies only if the list of prohibited communication channel frequencies contains a number of communication channel frequencies less than or equal to a predefined limit.

2. The tire management system as set forth in claim 1, wherein the predetermined number of times is selected to ensure that the channel is unable to be used.

3. A tire management system comprising:
   a plurality of sensor modules, which each measure quantities of state of a tire and transmit the measured data to a vehicle body, each of said plurality of sensor modules being installed inside the tire mounted on a vehicle, and
   a plurality of receiving modules, which each transmit data request signals requesting said measured data to at least one of said plurality of sensor modules in predetermined cycles and obtain the measured data transmitted from the sensor module, each of said plurality of receiving modules being provided on the vehicle body,
   wherein each of said plurality of receiving modules transmits the data request signal to said at least one sensor module using a communication channel frequency selected from a plurality of communication channel frequencies other than any channel frequencies which have been used by any of the receiving modules to unsuccessfully communicate a number of times,
   wherein the number of times is within a range greater than or equal to N and less than of equal to a predetermined maximum,
   wherein N is a natural number of 1 or more, and
   wherein each of said plurality of receiving modules adds the communication channel frequencies which have been used by any of the receiving modules to unsuccessfully communicate a number of times to a list of prohibited communication channel frequencies only if the list of prohibited communication channel frequencies contains a number of communication channel frequencies less than or equal to a predefined limit.

4. A tire management system comprising:
   a plurality of sensor modules, which each measure quantities of state of a tire and transmit the measured data to a vehicle body, each of said plurality of sensor modules being installed inside the tire mounted on a vehicle, and
   a plurality of receiving modules, which each transmit data request signals requesting said measured data to said sensor module in predetermined cycles and obtain the measured data transmitted from at least one of said plurality of sensor modules, each of said plurality of receiving modules being provided on the vehicle body,
   wherein said tire management system creates and updates a list of prohibited communication channel frequencies;
   wherein each receiving module adds a communication channel frequency to the list of prohibited communication channel frequencies if the communication channel frequency has been used unsuccessfully to communicate with at least one of said sensor modules a predetermined number of times;
   wherein each receiving module transmits the data request signal to said sensor module using a communication channel frequency other than a communication channel frequency which is on the list of prohibited communication channel frequencies, and
   wherein said each receiving module adds the communication channel frequency to the list of prohibited communication channel frequencies only if the list of prohibited communication channel frequencies contains a number of communication channel frequencies less than or equal to a predefined limit.

* * * * *